Fig. 1

INVENTOR.
ALVIN P. DOUGLAS
BY
*Gobrick & Gobrick*
ATTORNEYS

Sept. 30, 1958 A. P. DOUGLAS 2,854,108
THREE SPEED PLANETARY TRANSMISSION AND
BRAKE MECHANISM FOR BICYCLES
Filed May 19, 1954 5 Sheets-Sheet 2

INVENTOR.
ALVIN P. DOUGLAS
BY Golrick & Golrick
ATTORNEYS

INVENTOR.
ALVIN P. DOUGLAS
BY
Golrick & Golrick
ATTORNEYS

Sept. 30, 1958   A. P. DOUGLAS   2,854,108
THREE SPEED PLANETARY TRANSMISSION AND
BRAKE MECHANISM FOR BICYCLES
Filed May 19, 1954   5 Sheets-Sheet 5

INVENTOR.
ALVIN P. DOUGLAS
BY
*Gobrick & Gobrick*
ATTORNEYS

United States Patent Office 2,854,108
Patented Sept. 30, 1958

2,854,108

THREE SPEED PLANETARY TRANSMISSION AND BRAKE MECHANISM FOR BICYCLES

Alvin P. Douglas, Cleveland, Ohio, assignor to The Murray Ohio Manufacturing Company, Cleveland, Ohio, a corporation of Ohio Application May 19, 1954, Serial No. 430,922

19 Claims. (Cl. 192—6)

This invention is directed to improvements in three speed bicycle transmission mechanisms and the general object thereof is the provision of a combined planetary gear and pedal operated brake mechanism, the brake actuating mechanism being operable to transmit the braking effort without the same being transmitted through the gear members.

An object of the present invention is the provision of the mechanism above referred to within the confines of the axial dimensions of the rear wheel hub of a bicycle so that the unit can be combined with a rear bicycle wheel to constitute a conversion unit for a standard bicycle whereby the frame forks need not be sprung beyond the inherent spring thereof when the unit is mounted.

Another object of the present invention is the provision of a transmission unit of the character referred to which will afford an overspeed, an underspeed and direct drive speed while being confined both in axial and radial directions thereby to afford a minimum weight.

A still further object is the provision of a brake and brake operating mechanism within a transmission unit of the type referred to which will be operable at any selected setting of the transmission gears.

Still another object is the provision of driving and driven members selectively connectable to the planetary cage or ring gear while the driven member is supported on the driving member and on the hub structure.

Another object of the present invention is the provision of a speed change and brake unit of a two way free wheeling type of permit of the back wheeling of the bicycle when not being ridden.

Other objects of the invention will become apparent to those skilled in the art from the following description of the mechanisms shown in the drawings. The essential characteristics thereof are summarized in the appended claims.

The present invention contemplates the combining of a brake mechanism and actuating means therefor which is operable by the bicycle rider upon reversal of the pedals regardless of the gear setting. The arrangement of the braking elements is such that the brake actuator means extends axially of the axle and hub structure in such manner as to permit of the use of a selective planetary speed change transmission within the hub and whereby none of the braking effort is transmitted by the gear and cage elements. This permits of such design and construction of the transmission elements and associated mechanism that the entire unit including the hub structure can be confined to minimum dimensions and weight and can be used as a conversion or replacement of a standard coaster and hub mechanism. Free wheeling and back wheeling are desirable functions of the mechanism, and for this reason the means carried by the hub engageable with the planetary system for driving engagement of the hub preferably includes a free wheeling clutch.

Figure 1:
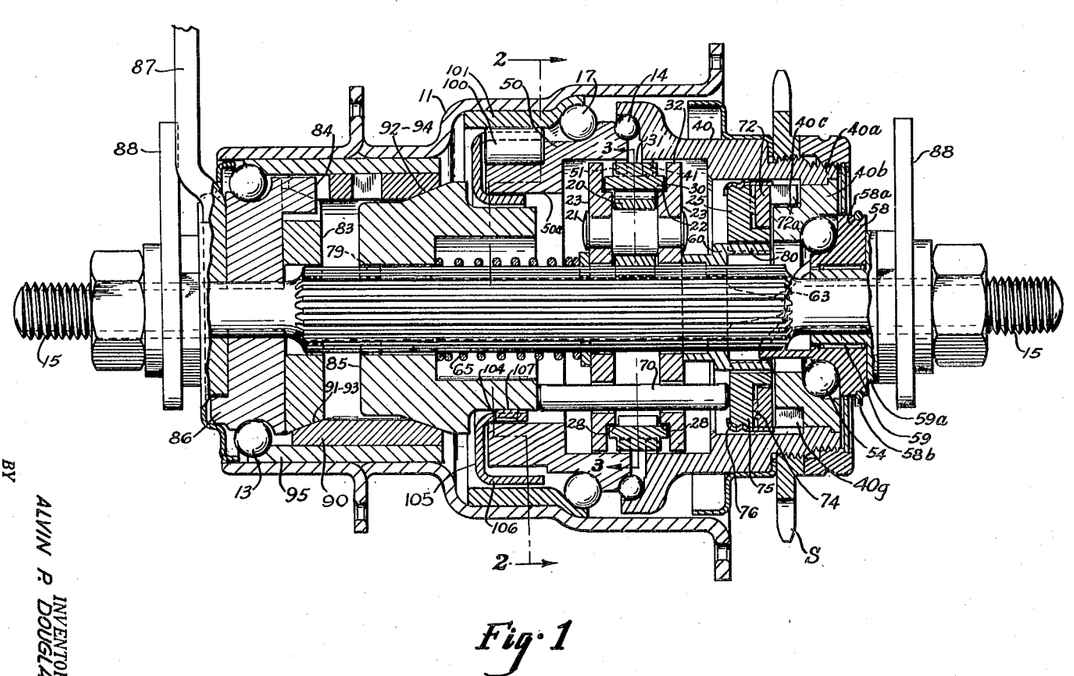
Fig. 1 is a horizontal cross section taken through the center of the axle.

Referring to Fig. 1 of the drawings, the horizontal axial cross-section, a special hub structure generally indicated by the reference numeral 11 is supported at the brake end by a bearing structure 13 and at the sprocket or driving side by a bearing structure 14 supported on an extension of a driven member to be described.

Within the hub structure is a brake mechanism, a roller clutch mechanism, a selective planetary gear system, a brake actuating means and a speed selector or planet cage shipper mechanism. The axle 15 is preferably formed as a sun gear substantially throughout the internally disposed part thereof whereby it may serve as a fixed sun gear of the transmission and as a male spline member or keyway for various axially movable elements of the brake mechanism per se, the brake actuating mechanism and the speed selector or shipper mechanism.

The transmission system comprises planet gears 20 rotatable on studs 21 which comprise part of an axially shiftable cage structure consisting of spaced plates 23. The planets mesh with the fixed sun gear formation of the axle and with a ring gear 30 rotatably supported internally of cylindrical end portions 28 by shoulders 22 formed on the inside of the cage structure plates 23. The cage structure rotates upon the circumferential faces of the sun gear teeth comprising the sun gear fixed axle. As shown in Fig. 1 the perimeter of the planet cage is provided with clutch or coupling teeth 32 and the ring gear 30 has like teeth 31. A driving member 40 is shown with clutch or coupling teeth 41 complementary to the teeth on the cage and ring gear. A driven member 50 is shown with like teeth 51 disposed at a distance from the driver teeth 41 and the width of the driving and driven teeth is such as to clear in the axial spacing between ring gear and cage plate on shifting of the planet and ring gear teeth when the planet cage is shifted along the axle. It will be noted in Fig. 3 that six clutch teeth are shown on each toothed member thus providing considerable back lash between the teeth while in Fig. 10 four clutch teeth are shown on the cage and ring gear and on the driving member.

The speed setting shown in Fig. 1 is that of direct drive i. e. when the driving member 40 and driven member 50 are coupled to the ring gear 30. When the planet cage is shifted to the left in Fig. 1, the driving member 40 becomes coupled to the cage and the driven member remains coupled to the ring gear. This setting produces an overdrive on the driven member 50. When the planet cage is shifted to the right as viewed in Fig. 1, underdrive is produced by the resulting coupling of the driving member 40 to the ring gear 30 and the driven member to the planet cage.

Figures 3, 4:
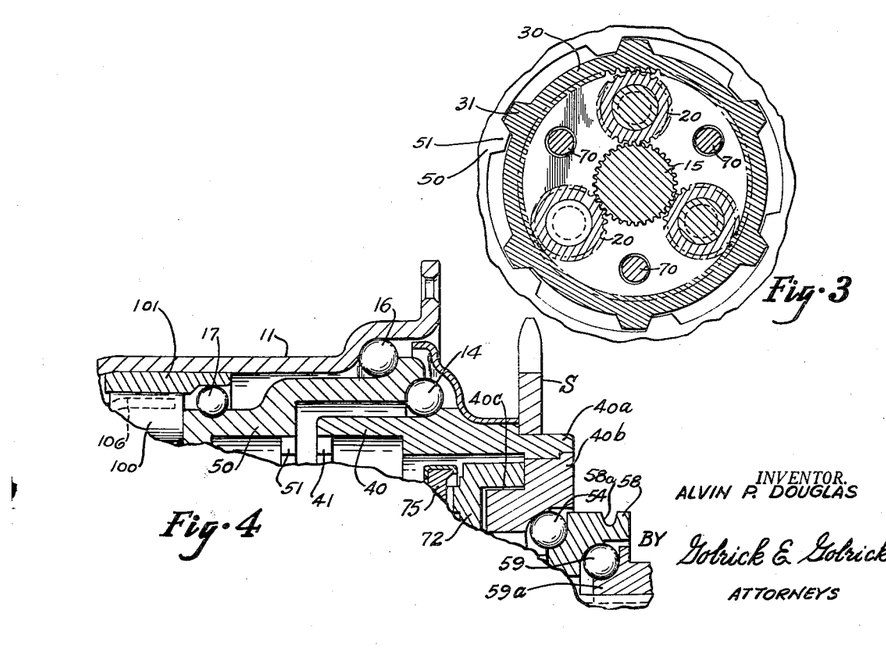
Fig. 3 is a transverse cross sectional view taken along the line 3—3 of Fig. 1.
Fig. 4 is a fragmentary cross sectional view showing another manner of mounting the driven member of the transmission independently of the axle structure of the mechanism.

It will be noted in Figs. 1 and 4 that the driven member 50 is in the shape of a stepped cylinder extending axially outward to bearing formation 14 disposed between the driving and driven members. Inward thereof the driven member has an innermost bearing formation 17 and an extension 50a comprising a roller clutch mechanism for coupling the driven member 50 to the hub on forward drive and to afford free wheeling. In Fig. 4 where the driven member stepped cylinder 50 surrounds a substantial part of the inner end of the driving member 40, additional support is provided by bearing 16 having an inner race formation near the end of member 50 and an outer race formation in a shouldered enlargement inward of the adjacent spoke flange of hub member 11. Thus the driven member and roller clutch supports are remote from the axle structure. The roller clutch mechanism herein will later be described.

The driving member 40 is in the general form of a cylinder with a sprocket carrying extension 40a fitted and fixed to a bearing portion 40b which comprises a brake operating cam as will be explained. The driving member is supported upon a bearing structure 54 disposed between driving member portion 40b and a revolvable shipper cam member 58. A further bearing structure 59 is disposed between the shipper cam 58 and a bearing cone 59a fixed to the axle (see Figs. 1, 4 and 8).

Figures 5, 6:
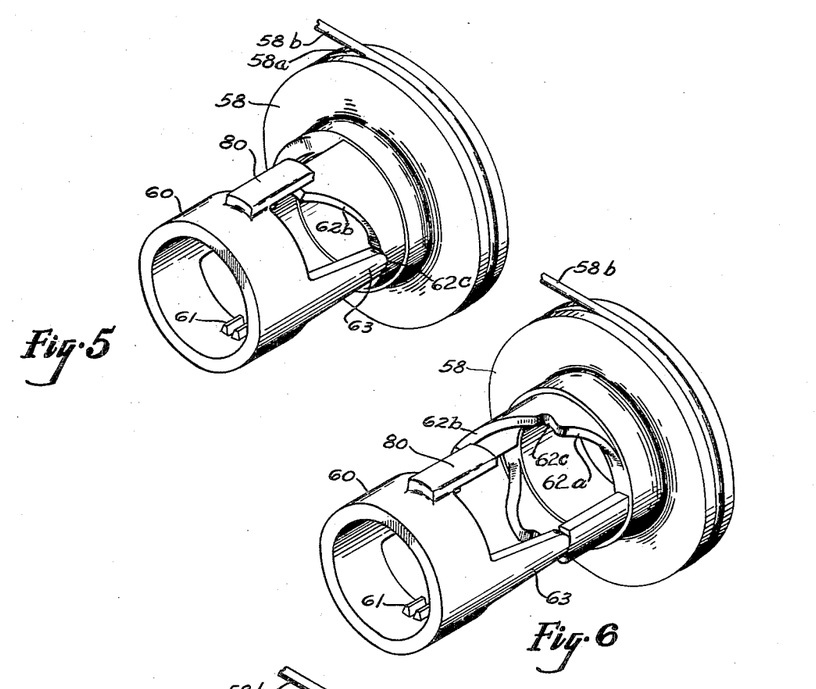
Figs. 5, 6 and 7 are telescopic views of the transmission shipper means for selectively shifting the planetary system along the axle and illustrating three selectable positions respectively.
Figure 7:
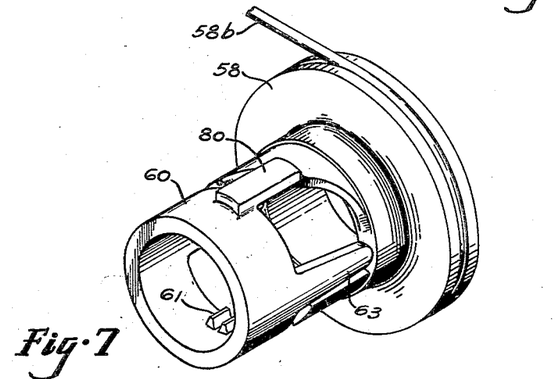

The cage shipper or shifter mechanism, as shown in perspective in Figs. 5, 6 and 7 comprises an axially shiftable cam following thimble member 60 loosely spline connected to the axle by lugs 61 fitting the sun gear formation of the axle so that this member while being maintained nonrotatable can be thrust against the hub of the planetary cage structure, and this thrust is effected by a stepped cam formation 62 formed on the member 58. A cam follower 63 is formed on the thimble member 60 to bear upon the cam formation of the member 58 and an axially extending spring 65 on the axle structure disposed between an element of the brake mechanism and the planetary cage serves to yieldingly oppose inward movement of the planetary system, i. e., the assembly of cage and gearing. As shown in Figs. 5, 6 and 7 there are two rises 62a and 62b shown on the hollow cylindrical portion 62 of the member 58 and the axial heights of these rises are equal to the axial spacing of the ring gear coupling teeth 31 and the cage teeth 32 plus a small amount of overtravel and at the terminus of each rise is a cam land 62c slightly depressed to form a retaining hollow in which the rounded end of the follower 63 rests thereby to maintain the selected position of the shifted planetary cage, the spring 65 serving to hold the cammed relation described.

The member 58 may be revolved in any suitable manner such as a lever operated with cable means extending to the front end of the bicycle, the required revolving motion being not in excess of 90° to attain the three positions of the planet cage. As shown in the drawings the outer end of the member 58 may be provided with a cable groove 58a whereby a shipper cable 58b wrapped about the member 58 with its end secured thereto serves to revolve the cams to selected positions and a cable operating selector lever and a spring (not shown) acting on the cable serve to operate the cable positively in one direction (inward shifting of the cage) and by spring action in the opposite direction (outward shifting of the cage by spring 65). Thus the cage is shifted from right to left as viewed in Fig. 1 in a positive manner; and in reverse direction by cable spring effort causing the cam formation to recede and by spring effort shifting the cage structure and thimble member 60 outwardly as the finger 63 thereof follows the receding cam formation. Thus Fig. 5 shows the cam setting for direct drive. Fig. 6 shows the setting for overdrive and Fig. 7 for underdrive. It will be apparent that the speed selecting and shipper means is operable independently of any forward or backward movement of the driving member 40 and its sprocket.

Figures 10, 11:
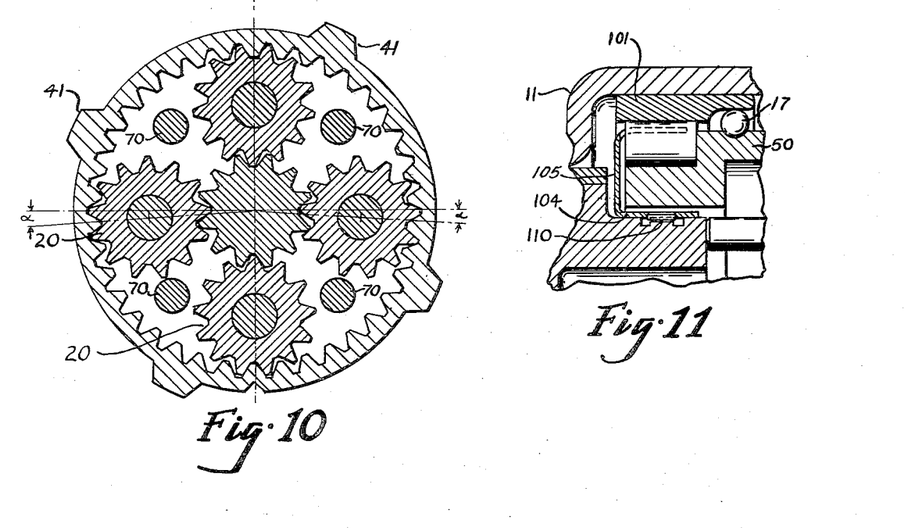
Fig. 10 is a cross section of a modification of the gear arrangement shown in cross section in Fig. 3.
Fig. 11 is a cross section of a modification of the roller cage retarding means shown in Fig. 2.

As hereinbefore stated the brake mechanism is such as to be operable upon a reverse pedal movement in the customary manner by an axially thrusting cam formation 40d on the part 40b of the driving member. This thrust is transmitted through an axially extending means including three thrust rods 70 as shown in Figs 1 and 3 or four rods as shown in Fig. 10. These rods are carried on the cage structure, the connections of the elements being such that forward rotation of the cage and planetary gearing is unimpeded at all times but the rods are poised to receive and transmit the braking thrust at any arrested position of rotation of the planetary system. Thus the rods 70 extend loosely through the cage structure with three of them as shown as being equi-angularly equi-radially spaced on the cage structure intermediate the planet gears 20, while in Fig. 10 four of them are shown.

Figure 8:
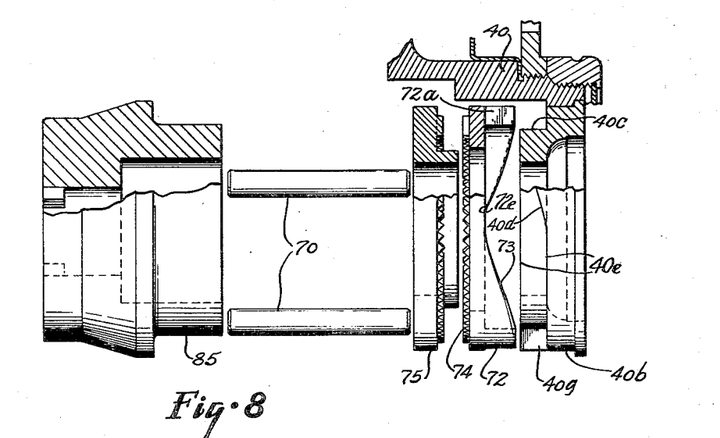
Fig. 8 is an exploded view of the brake operating elements.

Transmission of the braking thrust from the driving cam to the rods 70 on back pedalling for braking is effected through a rotary to axially shiftable conversion means in the form of a camming member 72 supported on a shoulder 40c formed on the driving member (see Fig. 8). The outer end face 73 constitutes the camming end of member 72 while its inner end face (74) constitutes a serrated clutch formation engaging a like formation on a pressure or thrust ring 75 which abuts the outer ends of the rods 70 in slip relation thereto. The opposed cam faces or slopes of members 72 and 40 are separated or terminated at radial shoulder surfaces 72a and 40g with flat lands 72e and 40e respectively formed thereon so that on forward drive rotation of member 40 there is no mutual camming action. Shoulder lug 72a on member 72 is then rotated in forward direction by contact with shoulder lug 40g, and is free to move axially slightly to the right to escape engagement at the serrations. A drag sleeve 76 formed of spring metal serves to maintain the serrated faces of the two members 72 and 75 in poised relation. The member 75 is prevented from rotation by a loose splined connection 80 between the non-rotatable thimble member or cam follower 60 and the member 75. The drag spring 76 serves to obstruct rotation of the member 72 when the cam thrust of the driving member is exerted upon the member 72. Upon reverse pedal action, the planetary gear system is at rest due to the circumferential clearance or back lash between the coupling teeth 31 and 32 of the planetary mechanism and the coupling teeth 41 and 51 of the driving member 40 and driven member 50 respectively. Hence the camming action of the driver upon the face 73 of member 72 is rendered more positive and the pressure ring 75 acts upon the rods 70 in an axial direction through the arrested planet cage to a brake band cone expander member 85 loosely splined on the axle at 79.

Figure 9:
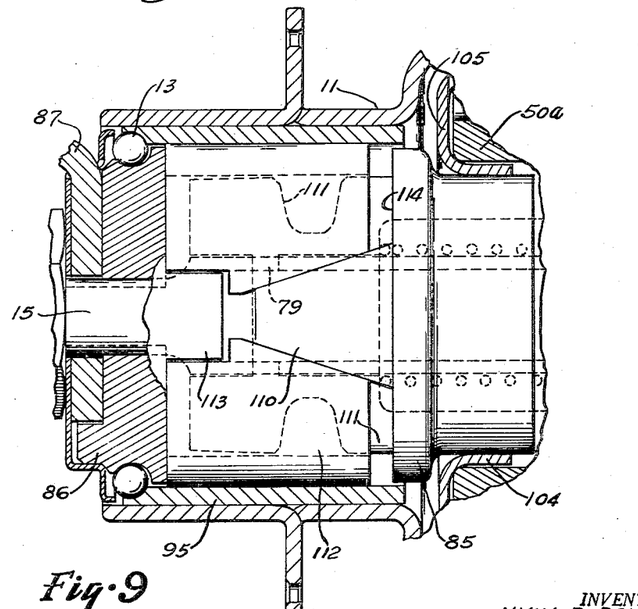
Fig. 9 is a view of an alternate form of brake mechanism adapted to the illustrated transmission and brake actuating mechanism shown in the drawings.

The brake mechanism per se may be of the cone spreading type as shown in Fig. 1 or of the wedge spreading type as shown in Fig. 9 as will be understood by those skilled in the art. In the two forms shown the anchor member 86 is secured to a torque arm 87 which is adapted to be connected to the bicycle frame 88 in a well known manner. The anchor member 86 constitutes a bearing support or race for the bearing mechanism 13 supporting the hub end. In Fig. 1 is shown a self constricting split brake band cylinder 90 notch connected to the anchor member 86 at lug 84. This member has its inner end portions tapered as at 91 and 92 to rest upon corresponding tapered surfaces 93 and 94 respectively formed on members 83 and 85. The member 83 is splined to the axle to be disposed adjacent the anchor member 86 and spaced from the member 85. Member 90 is expanded into braking action upon the brake sleeve 95 constituting a part of the hub structure. Thus upon reverse or braking action of the pedals, the thrust ring 75 is axially shifted against the ends of the rods 70 which thrust upon the member 85 and the band 90 is expanded while being prevented from rotating by the anchor member 86. Upon release of the braking pressure on the rods the inherent constricting power of the band 90 forces the member 85 and rods 70 in an outward direction and the pressure ring 75 cams the member 72 outwardly as the brake camming surface 40d recedes from pressure applying position upon forward driving movement of the driving member when shoulders 72a and dog 40g come into engagement. If desired a helical spring (not shown) may be interposed between the members 83 and 85 to lessen the constricture force required of the brake shoe to return the brake actuating elements to initial position.

In the brake mechanism shown in Fig. 9 a wedge member 110 is supported upon a spool structure 111, the spool structure also supporting a brake band 112 notch connected at 113 with the anchor member 86. This spool structure may, if desired, be a part of the member 85 but in any event is loosely splined to the axle member at 79. The member 85 in this structure is provided with a thrust shoulder 114 which thrusts upon the protruding end of a wedge member by the action of the thrust rods 70 upon the member 85. When this pressure is relieved the constrictive action of the brake member cams the wedge and member 85 in a direction toward the sprocket. The cycle of operation is the same as the cone type brake expander illustrated in Fig. 1.

Figure 2:
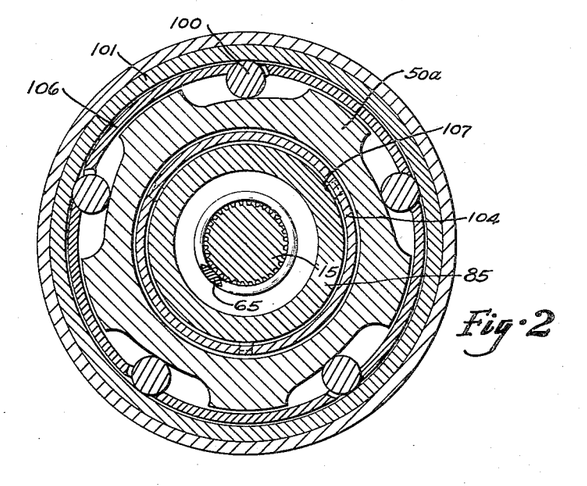
Fig. 2 is a transverse cross sectional view taken along the line 2—2 of Fig. 1 through the roller cage.
Figure 12:
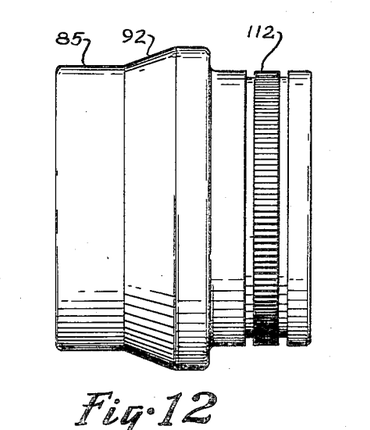
Fig. 12, in side elevation, shows the modified form of the brake expander cone member of Fig. 11.
Figure 13:
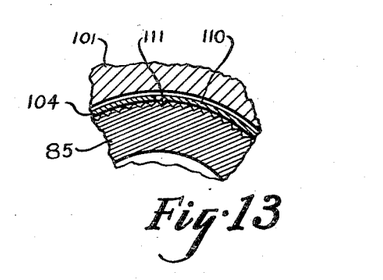
Fig. 13 is a fragmentary radial sectional detail showing the modified relation of the cone member of Figs. 11 and 12 with cooperating adjacent elements.

As stated the roller clutch mechanism between the hub sleeve 101 and driven member 50 comprises a roller camming end portion 50a which carries rollers 100 to grip the sleeve 101 constituting part of the hub structure. To prevent this clutch mechanism from remaining engaged when back wheeling of the bicycle is desired, there is provided a roller cage structure in the form of a drag spring construction arranged to snub on a cylindrical surface of the non-rotatable brake cone member 85. In Fig. 1 this spring construction comprises a cylindrically formed hub portion 104, a disk portion 105 and roller cage portion 106 which extends parallel and adjacent to the rollers 100. The hub 104 has spring pads 107 sheared to form spring pressure pads on the non-rotating brake member thereby to cause the roller cage to act as a drag on the rollers during both forward and rearward rotation of the hub. The action is as follows: on forward drive the cage drags upon the rollers thus causing an immediate clutching action as illustrated in Fig. 2. When the rider approaches a dismounting locus free wheeling takes place since driving pedal action has ceased, but the rollers under certain conditions may tend to remain clutched. Upon back wheeling of the hub an imperfect clutching action between rollers and hub may exist but the cage obstructs the rearward movement of the rollers thus forcing them to unclutching position. A free wheeling condition is thus maintained for either forward or backward movement of the wheel hub. In Figs. 11–13, in lieu of pressure pads, spring fingers 110 are sheared out of the hub portion of the cage structure and the ends 111 of these fingers are shaped radially inward to engage the serrations of a knurl formation 112 formed on the non-rotating brake expander cone member 85.

In the construction illustrated by Figs. 1 and 3 the over and under speed ratios are 1.33 and .75 respectively. The associated braking and gearing mechanisms are such that these ratios could be changed if desired, one change being illustrated in Fig. 10 wherein the speed ratios are 1.285 and .79. In the Fig. 10 form four planet gears are shown and while involving the use of an additional gear element, the extra operative stability of the cage and ring gear thus obtained warrants the extra cost for it is impossible thereby to maintain a more concentric relation of both the ring gear and cage. Also by the use of four planet gears instead of three, the load to individual teeth is lessened. By proper choice of relative number of teeth, any tooth of the sun gear will not mate with the same tooth of the planet until several revolutions of the planet about the axle take place. Hence the probability of shock being repeatedly applied to the same meshing teeth of sun and planet can be avoided. Thus in the ratios shown in Fig. 10 when using 32 pitch gears, there are twelve teeth in the sun gear formation, thirteen teeth on the planets and thirty-eight teeth on the ring gear, with one pair of planets diametrically opposed, and the other pair each dropped through angle $\alpha$ (here 3° 36′) from a line 90° to the diameter through the first pair to secure proper meshing. The same teeth between sun and planet gears will not repeat the mesh until thirteen revolutions of the planets has taken place.

Hence shock due to the rider jumping on pedals to accelerate starting of the bicycle is distributed to different meshing teeth at different times and repeated bending and shearing stresses on particular meshing teeth is prevented.

The entire assembly can be extracted from the hub and axle by slipping the same off of the sprocket end of the axle when the bearing cone 59a is removed. All braking effort is transmitted from the driving member to the brake mechanism without loading or stressing any of the elements of the transmission mechanism and the same extent of braking effort is exerted regardless of the selective gear setting. The overall dimensions of the rear wheel assembly can be confined to relatively small hub diameters and almost standard hub width so that the units can be used to convert a direct speed bicycle to a multispeed bicycle. All of the elements may be of rugged design.

Other advantages will appear to those skilled in the art of three speed bicycle transmission and coaster brake mechanisms. The hub construction herein shown may be produced after the manner of the hub construction disclosed and claimed in my Patent No. 2,798,771.

The actuating means for the shipper mechanism (not shown) may take any form which will impart sufficient turning movement to the shifter cam 62 to effect the selective shifting of the planet cage and gears and it is preferable that a yieldable means be used whereby the teeth of the driving and driven members will be yieldably urged into splined relationship with the splines or teeth on the planet and ring gear. The restraining influence of the spring member 104—107 on the driven member is sufficient to prevent uncontrolled rotation of the driven member at any time the teeth of the driven member happen to be free or unconnected relative to the cage or ring gear.

It will be apparent that the preferred bearing arrangement shown in Fig. 4, in a beam sense, will be much more effective in maintaining a concentric relationship of all of the rotating parts of the mechanism when the rear wheel of the bicycle is carrying a heavy load—such as an extra rider on the rear of the bicycle—in that the bearing members 14—16 are disposed closer to the sprocket bearings 54—59.

It is contemplated that the sprocket S will be brazed to the driving member 40 at the time the driver parts 40a and 40b are brazed together and should occasion arise to equip the mechanism with a different size sprocket the driving member would be replaced with another driving member carrying the desired sprocket size brazed thereto, i. e. driving members with different size sprockets would be carried in stock.

I claim:
1. A selective speed transmission and brake mechanism for bicycles comprising a fixed axle, a wheel hub structure rotatively mounted on the axle, a brake mechanism within the hub and actuatable upon the interior of the hub and supported by the axle, an axially shiftable planetary cage and gear train supported on the axle, a sprocket driven driving member rotatably supported between the wheel hub and axle, a driven member adapted to be selectively coupled to the planetary cage and gear train, said driven member being rotatively supported solely by the hub structure remote from the axle and having a roller clutch mechanism at the inner end thereof adapted to engage the interior of the hub upon forward drive of the driven member, and a brake actuating means effective upon reverse movement of the driving member, said means including axially extending means carried by the planetary cage and radially inwardly of the roller clutch mechanism of the driven member for transmitting a brake actuating thrust effected by the driving member to the brake mechanism.

2. A selective speed transmission and brake mechanism for bicycles comprising a fixed axle, a wheel hub structure rotatively supported by the axle, a brake mechanism within the hub, an axially shiftable planetary cage structure and gearing supported on the axle, a driving member for driving the gearing through selective connections to the cage or gearing by axial movement of the cage, said gearing being rotatably supported by the cage and drivingly engaged by the axle, said cage and gearing being selectively and drivingly engaged between the driving member and hub, a plurality of rods slidably carried by the cage and extending in an axial direction from the braking mechanism to the driving member, by-passing through the shiftable planetary cage structure, and means on the driving member and disposed between the rods' ends and that member for exerting a brake actuating effort upon the rods in an axial direction upon a reverse movement of the driving member.

3. A selective speed transmission and brake mechanism for bicycles comprising a fixed axle constituting a sun gear of a planetary gear system, a wheel hub structure rotatable on the axle, a driving member disposed exteriorly adjacent one end of the hub structure, braking mechanism disposed within the other end of the hub structure, an axially shiftable planetary gear train disposed within the hub structure intermediate the braking mechanism and the driving member, a driven member supported by the hub structure independently of the axle, clutch means disposed between the hub and driven member, shipper means for selectively shifting the planetary gear train longitudinally of the sun gear including a non-rotating shipper sleeve on the axle in abutting relation to the cage, a brake operating cam means on the driving member serving to operate the brake mechanism independently of movement of the planetary gear train, and axially extending thrust means passing through the cage structure to the brake mechanism and including a non-rotatable thrust ring disposed between the cam means and the thrust means.

4. A selective three speed transmission for bicycles comprising a fixed axle, a wheel hub structure rotatively mounted on the axle, a non-rotatable sun gear formation on the axle, an axially shiftable planet cage on the sun gear axle and a ring gear having transmission coupling teeth of the same diameter formed about the perimeters thereof, a driving member having transmission coupling teeth formed to selectively engage the cage and ring gear teeth when the cage is axially shifted, a driven member rotatably supported solely by the hub structure and independently of the axle, said driven member having coupling teeth like the driving coupling teeth and disposed in a predetermined axially spaced relation to the coupling teeth of the driving member, said driven member having a cylindrical formation extending axially outward to afford a bearing between the hub and the driven member, a bearing between the driving member and the driven member, a brake mechanism and a brake actuating means extending through the cage to the brake mechanism independently of the driven member.

5. A selective three speed transmission for bicycles comprising a fixed axle, a wheel hub structure rotatively mounted on the axle, said transmission comprising a fixed sun gear on the axle, an axially shiftable planet cage and ring gear having transmission coupling teeth of the same diameter formed about the perimeters thereof, a driving member having transmission coupling teeth formed to selectively engage the cage and ring gear teeth when the cage is axially shifted, a driven member rotatably supported solely by the hub structure and independently of the axle, said driving member having coupling teeth like the driven coupling teeth and disposed in a predetermined axially spaced relation to the coupling teeth of the driving member, said driven member having a roller clutch formation extending axially inward to afford a clutch between the hub and the driven member, a brake mechanism and a brake actuating means extending through the axially shiftable planet cage.

6. A selective three speed transmission for bicycles comprising a fixed axle, a wheel hub structure rotatively mounted on the axle, said transmission comprising a fixed sun gear axle, an axially shiftable planet cage and ring gear having transmission coupling teeth of the same diameter formed about the perimeters thereof, a driving member and a driven member having transmission coupling teeth formed to selectively engage the cage and ring gear teeth when the cage is axially shifted, the driven member being rotatably supported solely by the hub structure, said driven member having the coupling teeth thereof disposed in a predetermined axially spaced relation to the coupling teeth of the driving member, said driven member having a cylindrical formation extending axially outward to overlie the driving member thereby to afford a bearing between the hub and the driven member and a bearing between the driving member and the driven member, a roller clutch mechanism formed on the inner end of the driven member for clutching the driven member to the hub upon forward drive of the driving member, a brake mechanism and a brake actuating means extending through and carried by the planet cage.

7. A selective speed transmission and brake mechanism for bicycles comprising a hub structure, a fixed axle, a brake mechanism, a planetary system wherein the fixed axle is a sun gear and a planet carrier is slidable thereon, driving and driven members associated with the planetary system to be selectively connected thereto, said driving member being located at the sprocket side of the hub structure and said brake mechanism being at the opposite side of the hub structure and said planetary system being arranged intermediate the driving member and the brake mechanism, axially movable brake actuating means supported by the carrier of the planetary system for operatively connecting the driving member to the brake mechanism, and a roller clutch mechanism located between the planetary system and the brake mechanism for operatively connecting the driven member to the hub.

8. In a planetary gear mechanism of the character described, a fixed axle, a planetary gear cage slidable on the axle, a selective cage shipper mechanism comprising a multi-stepped cam barrel adapted to be rotatably mounted on the axle and a non-rotative thimble member on the axle abutting the cage and having a cam follower resiliently maintained in contact with the cam formation of the barrel and said cam formation having non-camming lands between the cam rises of the barrel with depressions defining the positions of the cam formations relative to the axial position of the thimble.

9. In a planetary gear mechanism of the character described, a fixed axle, a planetary gear cage slidable on the axle, a selective cage shipper mechanism comprising a multi-stepped cam barrel adapted to be rotatably mounted on the axle and a non-rotative thimble member on the axle in abutting relation to the cage, an opposing spring acting on the opposite side of the cage whereby the thimble member is resiliently maintained in contact with the cam formation of the barrel and said cam formation having non-camming lands between the cam rises of the barrel with depressions defining the cam formations relative to the axial position of the thimble.

10. In a planetary gear mechanism of the character described, a driving and a driven member, an axle, an axially shiftable planetary system on the axle including a planet cage slidable on the axle, a spring acting against one side of the cage, a selective cage shipper mechanism comprising a multi-stepped cam barrel adapted to be rotatably mounted on the axle and a non-rotative thimble member on the axle resiliently maintained in contact with the cam formation of the barrel by said spring and cage and said cam formation having non-camming lands between the cam rises of the barrel, a non-rotating cam follower on the axle, a braking mechanism, a brake actuating mechanism actuated by the driving member and including a non-rotating axially movable thrust member spline connected to the thimble member.

11. In a bicycle transmission and brake mechanism, a fixed axle, said axle being in the form of a sun gear substantially throughout its length, a planetary cage with planet gears slidable on the sun gear formation, a selective shifter means on the axle including a non-rotatable element loosely splined on the axle sun gear for positively shifting the cage in one direction, a resilient means on the axle for shifting the cage in the opposite direction, a brake actuating mechanism having an element splined loosely on the axle sun gear formation in abutting relation to said resilient means and also having a non-rotatable thrust member for developing an axial thrust for application upon said element of the brake actuating mechanism, said thrust member being in loosely splined connection with said non-rotating element of the shifter means.

12. In a bicycle brake and transmission mechanism, a fixed axle in the form of a sun gear substantially throughout its length, a planetary cage slidably mounted on the sun gear and carrying planet gears in mesh with the sun gear formation of the axle, a shifter means for positively moving the cage in one direction including a rotatable cam member on the axle and a non-rotatable cam follower loosely splined to the sun gear formation of the axle, spring means on the axle for moving the cage in the opposite direction upon recession of the cam means, a brake actuating mechanism including a thrust member loosely spline connected to the cam follower member of the cage shifter means and brake operating means extending through the cage structure, an axially movable element mounted on the sun gear formation to be moved by the brake operating means extending through the cage and a brake shoe element expandable into braking action by the movement of the last named element.

13. A selective speed transmission and brake mechanism for bicycles comprising a hub structure, a fixed axle, a brake mechanism, a speed change planetary gear system including a shiftable planetary cage, driving and driven members associated with the gear system to be selectively connected thereto, said driving member being located at the sprocket side of the hub structure and said brake mechanism being at the opposite side of the hub structure, a clutch mechanism for connecting the driven member to the hub structure, said gear system being arranged intermediate the driving member and the break mechanism, and brake actuating rods extending through the planetary cage of the gear system for operatively connecting the driving member to the brake mechanism to actuate the brake mechanism into engagement with the hub structure upon reverse movement of the driving member.

14. In a bicycle transmission of the planetary type, a fixed wheel axle comprising a sun gear, a planet carrying cage supported solely by the sun gear to be shiftable thereon, planets on the cage in mesh with the sun gear, said planet gears having one more tooth than the number of teeth in the sun gear, a ring gear rotatably supported by the cage structure, clutch teeth on the perimeters of the cage and the ring gear, a driving member, a driven member, said members having clutch teeth complementary to the clutch teeth on the ring gear and the cage, there being a less number of clutch teeth on the cage and ring gear than on the driven member, roller clutch means for connecting the driven member to a bicycle hub upon forward driven movement of the driven member and means for disconnecting the roller clutch from the hub effective upon backward movement of the hub whereby the planetary system remains stationary upon backward movement of the bicycle.

15. In a bicycle transmission of the planetary type, a wheel hub, a brake mechanism within the hub, a single planetary gear train and shiftable cage within the hub, a driving member, a driven member, said members being arranged respectively on opposite sides of the planetary cage, a fixed sun gear supporting the cage, means for alternately shifting the cage toward either of said members, roller clutch means for connecting the driven member to the hub upon forward movement of the planetary system and means reacting on the brake mechanism for effecting disconnection of the roller clutch means from the hub upon a rearward turning movement of the hub.

16. A bicycle transmission of the character described comprising a wheel hub, a sun gear fixed axle, a braking mechanism within the hub actuatable upon the interior of the hub structure, a driving member, a shiftable assembly of planetary cage and gearing, said gearing rotatably supported by the cage in engagement with the sun gear fixed axle, said hub carrying means engageable by said assembly providing a driven engagement of the hub with said assembly, said cage and gearing being selectively and drivingly engaged between the driving member and the hub, means for shifting the cage and gearing for selective connection of the driving member to the cage and gearing, and means actuated by the driving member for operatively connecting the driving member to the brake mechanism including means carried by the shiftable cage effective to transmit brake actuating effort from the driving member to the brake mechanism upon reverse movement of the driving member at any selected connection between the driving member and the cage and gearing.

17. A bicycle transmission of the character described comprising a wheel hub, a sun gear fixed axle, a braking mechanism within the hub actuatable upon the interior of the hub, a driving member, a shiftable assembly of planetary cage structure and gearing, said gearing rotatably supported by the cage in engagement with the sun gear fixed axle, said hub carrying means engageable by said assembly providing a driven engagement of the hub with said assembly, said cage and gearing being selectively and drivingly engaged between the driving member and the hub, means for shifting the cage structure and gearing for selective connection of the driving member to the cage structure and gearing, and means actuated by the driving member for operatively connecting the driving member to the brake mechanism including means carried by the shiftable cage structure effective to transmit brake actuating effort from the driving member to the brake mechanism upon reverse movement of the driving member without exerting axial thrust upon the cage structure.

18. A selective speed transmission and brake mechanism for bicycles comprising a fixed axle, a wheel hub structure rotatively mounted on the axle, a brake mechanism within the hub and actuatable upon the interior of the hub and supported by the axle, an axially shiftable assembly of a planetary cage and a gear train rotatably supported by the cage, the cage being supported by and the gearing being drivingly engaged by the axle, a sprocket driven driving member rotatably supported between the wheel hub and axle, said hub carrying means engageable by said assembly providing a driven engagement of the hub with said assembly, said cage and gearing being selectively and drivingly engaged between the driving member and hub, and a brake actuating means effective upon reverse movement of the driving member, said actuating means including axially extending means slidably mounted on the planetary cage for transmitting a brake actuating thrust effected by the driving member to the brake mechanism independently of the gear train.

19. A selective speed transmission and brake mechanism for bicycles comprising a fixed axle in the form of a sun gear, a wheel hub structure rotatively mounted on the axle, a brake mechanism within the hub actuatable upon the interior of the hub and supported by the axle, an axially shiftable assembly of a planetary cage and a gear train rotatably supported by the cage, the cage being supported by and the gearing being drivingly engaged with the axle, said hub carrying means engageable by said assembly providing a driven engagement of the hub with said assembly, a driving member rotatably supported between the wheel hub and axle independently of the axle, said cage and gearing being selectively and drivingly engaged between the driving member and hub, and a brake actuating means effective upon reverse movement of the driving member, said actuating means including axially extending thrust means slidable on the planetary cage for transmitting a braking thrust effected by the driving member to the brake mechanism independently of the gear train.

References Cited in the file of this patent

UNITED STATES PATENTS

| | | |
|---|---|---|
| 863,425 | Newton et al. | Aug. 13, 1907 |
| 882,845 | Sachs | Mar. 24, 1908 |
| 2,180,527 | Jones | Nov. 21, 1939 |
| 2,609,712 | Hood | Sept. 9, 1952 |

FOREIGN PATENTS

| | | |
|---|---|---|
| 503,837 | Belgium | June 9, 1951 |

UNITED STATES PATENT OFFICE
CERTIFICATE OF CORRECTION

Patent No. 2,854,108 September 30, 1958

Alvin P. Douglas

It is hereby certified that error appears in the printed specification of the above numbered patent requiring correction and that the said Letters Patent should read as corrected below.

Column 4, line 23, for "with three of them are shown" read -- with three of them shown --; column 6, line 2, for "impossible" read -- possible --.

Signed and sealed this 12th day of May 1959.

(SEAL)

Attest:
KARL H. AXLINE
Attesting Officer

ROBERT C. WATSON
Commissioner of Patents